UNITED STATES PATENT OFFICE.

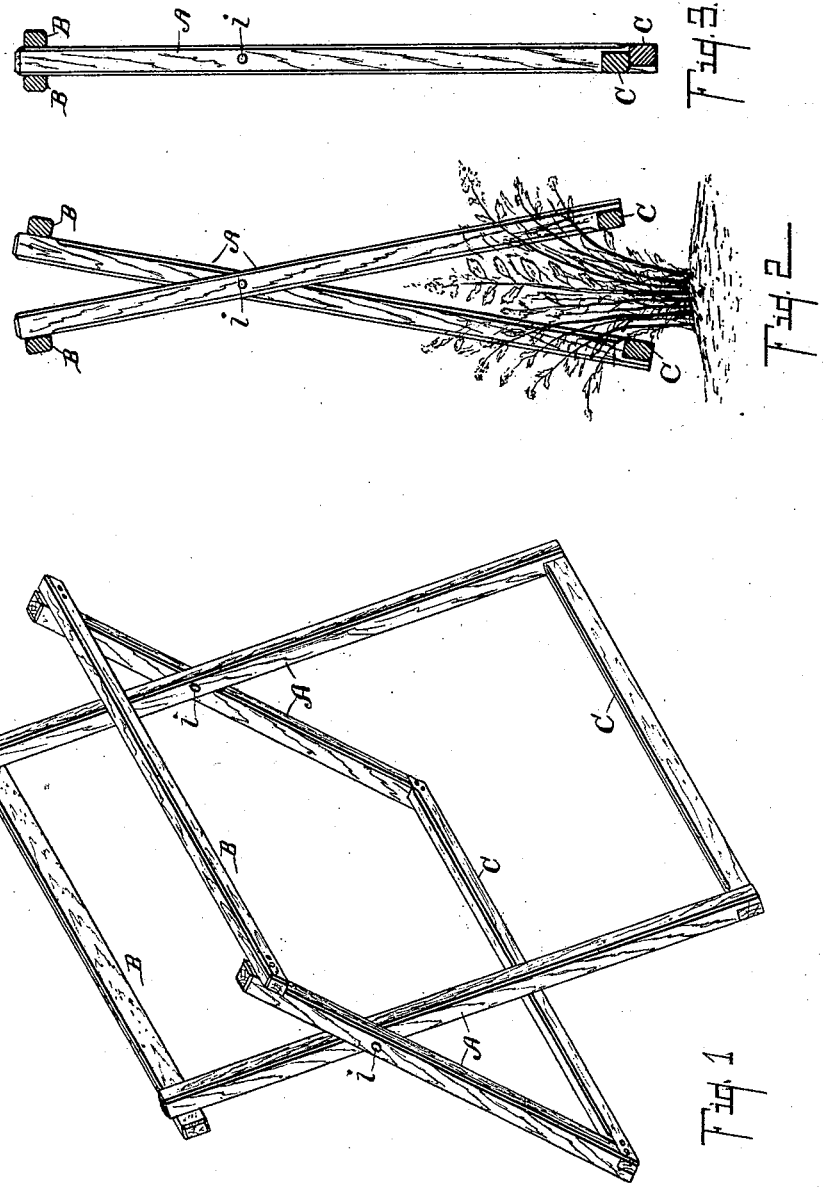

ORRA E. ABBEY, OF DAILEY, MICHIGAN, ASSIGNOR TO ALBERT M. TODD, OF KALAMAZOO, MICHIGAN.

MINT-HARVESTER.

SPECIFICATION forming part of Letters Patent No. 602,292, dated April 12, 1898.

Application filed May 25, 1896. Serial No. 592,896. (No model.)

*To all whom it may concern:*

Be it known that I, ORRA E. ABBEY, a citizen of the United States, residing at the village of Dailey, in the county of Cass and State of Michigan, have invented a certain new and useful Improvement in Mint-Harvesters, of which the following is a specification.

My invention relates to improvements in mint-harvesting implements.

This machine is especially designed for harvesting peppermint. Peppermint under proper cultivation on proper soil grows very rank and the stalks fall down together between the rows and present a mass of stalks that are interlaced and tangled together. In the proper cultivation of the mint the rows are hilled up and there is a considerable trench left between them. Under these conditions it will be readily understood that the proper cutting and harvesting of the mint is a matter of considerable difficulty. The method now in common use is by the use of a scythe the blade of which is inserted under the plants at one side of the row and pulled to cut off the plants at that side, proceeding to cut only one-half of the row at a time. Various devices have been attempted for elevating the mass of the plants between the rows so that the entire row could be cut at once. This method was impractical and wasted a considerable quantity of the plant, which is very valuable when properly grown, and the part wasted is very rich in the essential oil.

The objects therefore of my invention are, first, to provide an implement for the harvesting of mint which shall properly elevate the plants so that an entire row can be cut at a single operation; second, to provide an implement by means of which the entire crop of peppermint can be practically secured; third, to provide an implement which shall greatly facilitate the process of cutting mint, and further objects appearing in the detailed description.

I accomplish the objects of my invention by the implement and means shown in the following specification and illustrated in the following drawings, in which—

Figure 1 is a perspective view of an implement embodying all of the features of my invention. Fig. 2 is a cross-sectional view of the same in position for use over a row of plants. Fig. 3 is a vertical cross-sectional view of the same entirely closed together.

In the drawings similar letters of reference refer to similar parts throughout the several views.

My invention consists simply of two rectangles of wood or suitable material, the sides A of which are pivoted together at $i$ $i$, so positioned that the bottom bars C C close one above the other when the implement is closed. The top bars B B are bolted or secured across the sides of the side pieces A A on opposite sides of the pieces A from each other. It will be noted that one of the frames is necessarily a little longer and a little broader than the other and folds around the same in operation.

To use my improved implement, the operative takes the two bars B B in each hand and opens the implement out, as indicated in Fig. 1, crowds one bar C down between the rows, and closes the implement together by crowding the bars B B together, engaging the row of mint from both sides by the bars C C and then lifting, when it will be found that all of the plants of that row have been gathered together and lifted in position to be easily cut off by a single stroke of the scythe in the hands of a second operative.

Actual experience has shown that with the same number of men employed by use of this implement nearly twice the acreage of mint can be cut in a clean and satisfactory manner than can be so cut in any other way.

It will be readily understood by any skilled mechanic that this implement can be greatly varied in its construction without departing from my invention.

I have shown the invention in a practical form, but am aware that the invention can be made in different forms and accomplish the same result in the same way.

This machine is well adapted for use in harvesting a great variety of plants of similar habits and similar cultivation, such as spearmint, tansy, horehound, pennyroyal, and the like.

Having thus described my invention, what I claim as new, and desire to secure by Letters Patent, is—

1. In a mint-harvesting implement, the combination of rectangular frames one of which is slightly larger than the other, the sides A, of which are pivoted together at i, i, so that the bottom bars C, C, will fold one above the other with the top bars B, B, secured on opposite sides of the side pieces A, A, to form convenient handles for operating the implement as specified.

2. In a mint-harvesting machine the combination of two rectangular frames the sides of which are pivoted the one to the other so that they will open and close like a pair of shears so that the bottom bars can be used for grasping plants and the top bars can be used as convenient handles for operating the same as specified.

In witness whereof I have hereunto set my hand and seal in the presence of two witnesses.

ORRA E. ABBEY. [L. S.]

Witnesses:
   JAMES DIBBLE,
   ELLA WHITMORE.